J. B. GLOWACKI.
BALL CASTER.
APPLICATION FILED DEC. 29, 1911.
1,060,076.
Patented Apr. 29, 1913.
2 SHEETS—SHEET 2.
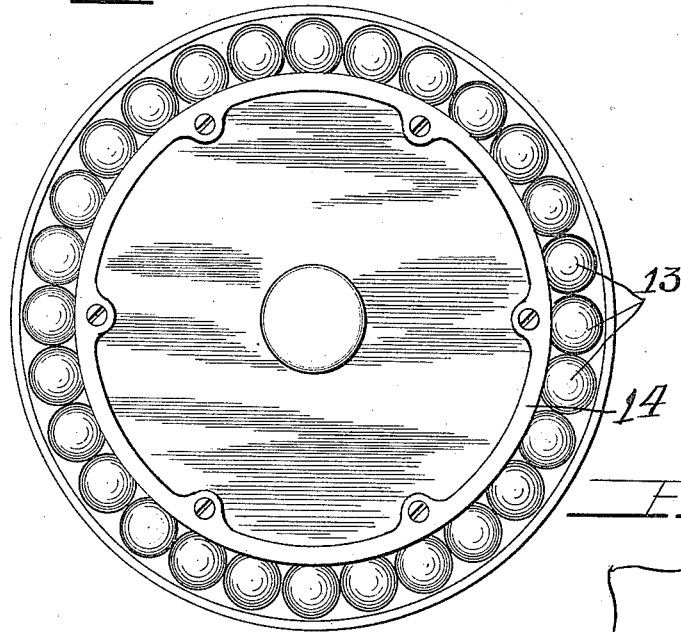
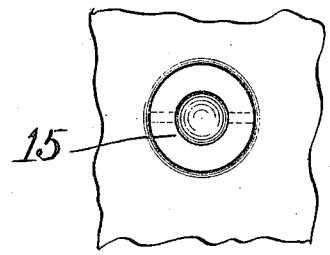
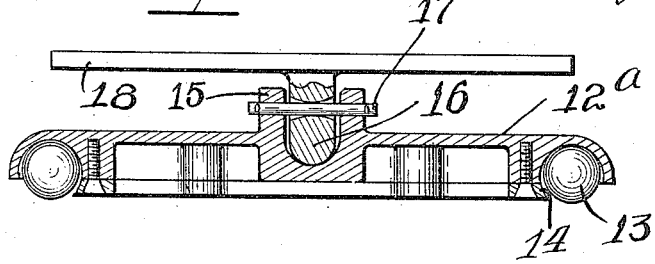

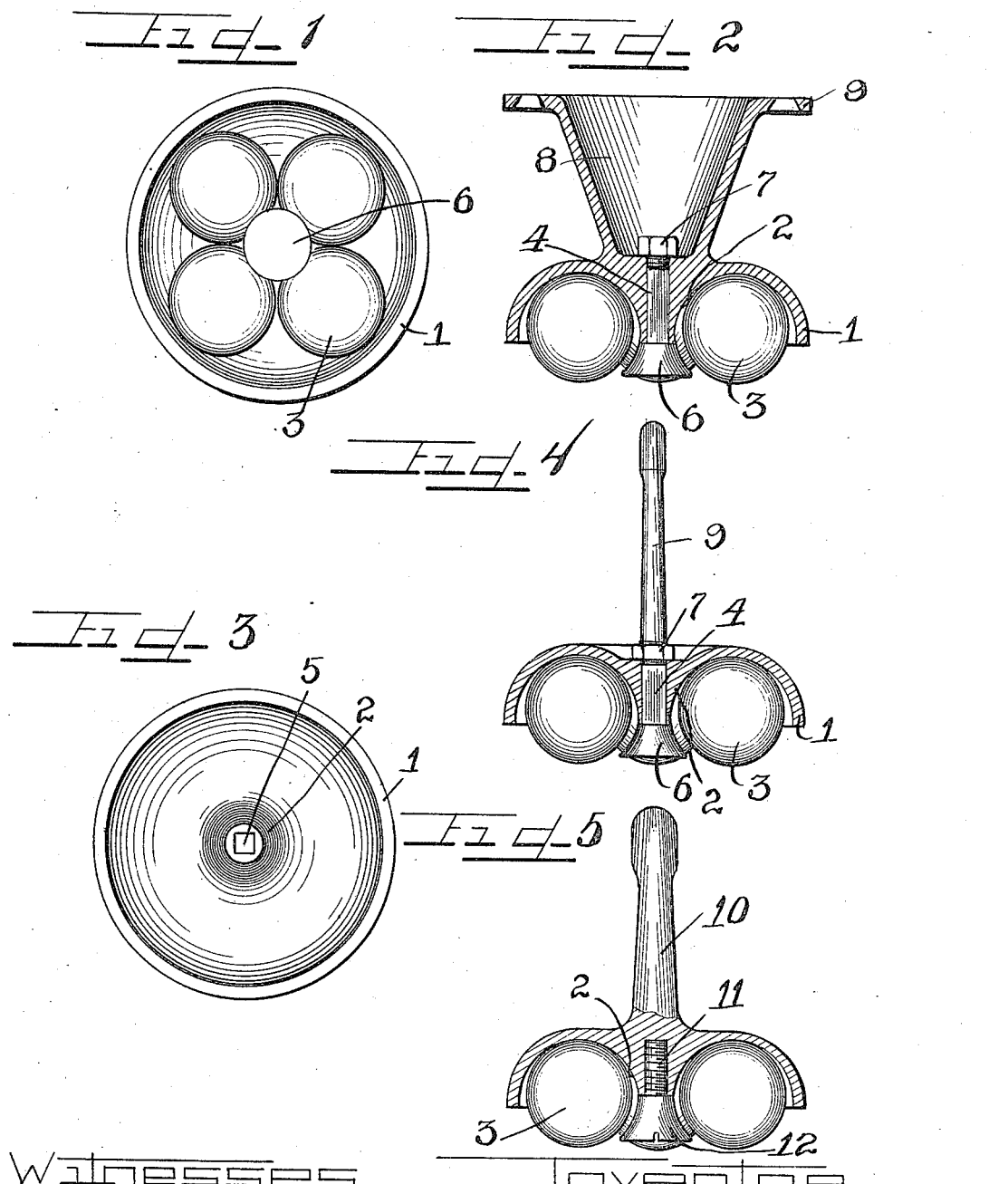

UNITED STATES PATENT OFFICE.

JOHN B. GLOWACKI, OF CHICAGO, ILLINOIS.

BALL-CASTER.

1,060,076.   Specification of Letters Patent.   Patented Apr. 29, 1913.

Application filed December 29, 1911. Serial No. 668,483.

*To all whom it may concern:*

Be it known that I, JOHN B. GLOWACKI, a citizen of the United States, and a resident of the city of Chicago, in the county of Cook and State of Illinois, have invented certain new and useful Improvements in Ball-Casters; and I do hereby declare that the following is a full, clear, and exact description of the same, reference being had to the accompanying drawings, and to the numbers of reference marked thereon, which form a part of this specification.

In many ball casters heretofore constructed it has frequently been found as a serious objection that the contact upon the floor being relatively small, causes the floor to be indented thereby when the weight supported on the caster was considerable, with the effect of rendering the caster difficult to move. As such casters have usually been constructed also, their use has been confined mainly to articles of furniture, and when such articles have been heavy, for instance, in the case of a piano, the relatively small surface contact of the single ball usually employed upon the floor, has been sufficient to indent the floor more or less, rendering the caster more difficult to move. Such casters have usually also been expensive and sometimes difficult to manufacture. One type of casters in quite extensive use is journaled in the table leg externally with its bearing upon the floor. This results in frequent breakage, as the load is supported obliquely the caster, and also consumes considerable of the energy applied to move the body in accomplishing the necessary rotation of the caster shank to bring the caster proper in line with the direction of movement of the body.

The object of this invention is to afford an exceedingly simple, strong and durable caster of the class described, in which a plurality of balls are employed to sustain the weight upon the floor, and with which the movement of the body supported by the caster will always be in the direction of the force exerted, and with the expenditure of minimum energy.

It is also an object of the invention to afford a caster adapted for use in supporting furniture upon floors, and also for any of the numerous other objects on which such devices are used, including the moving of heavy or large bodies in warehouses, shops or elsewhere.

It is also an object of the invention to reduce the device to extreme simplicity in all particulars.

The invention in its preferred form, is hereinafter more fully illustrated and described.

In the drawings: Figure 1 is a bottom plan view of a caster embodying my invention. Fig. 2 is a central vertical section thereof. Fig. 3 is a bottom plan view of the shell or bell for the balls, showing the balls removed. Fig. 4 is a central, vertical section and illustrating an attaching shank employed for attaching the caster. Fig. 5 is a similar view illustrating a slightly modified shank and means for engaging the balls in place. Fig. 6 is a bottom plan view of a caster of the class described, adapted for supporting the heaviest loads as well as for general warehouse and shop purposes. Fig. 7 is a vertical section taken through the bottom portion of the caster. Fig. 8 is a fragmentary top plan view of the dome of the caster.

As shown in the drawings: 1, indicates a circular dome or bell having an integral, central, conical portion 2, forming thereby an interior channel or ball race, as shown in Figs. 2, 4 and 5, and in which are secured steel or other suitable balls 3, in any desired number. As shown in Figs. 1 to 5 inclusive, four of such balls are employed, which fill the ball race, and are engaged in place (in the construction illustrated in Figs. 1, 2 and 4) by means of an angular bolt 4, which extends through a complemental aperture 5, shown as non-circular, at the axis of said dome or bell 6, which projects peripherally in each ball race to hold said balls in place. In the construction illustrated in Fig. 2, said bolt 4, is engaged in place by means of a nut 7, engaged on the protruding end of said bolt above the dome, and integral with said dome, is an upwardly flaring head 8, provided with a peripheral flange 9, having screw apertures therein to facilitate engagement upon the piano leg or other object it is desired to support upon the caster.

The construction illustrated in Fig. 4, is substantially identical with the construction illustrated in Figs. 1 and 2, except that said bolt 4, extends upwardly above the caster sufficient to afford the spindle 9, for engagement in the table or chair leg, or in the bottom of the object to be supported on the caster, said spindle being of less size than said aperture therefor in the dome, being inserted upwardly therethrough when the structure is assembled, and firmly held in place by means of a nut 7, such as before described, and threaded on said spindle to bear against the top of the dome.

In the construction illustrated in Fig. 5, the spindle 10, is cast (or otherwise constructed) integral with the dome or shell, and the balls are secured in the races by means of a cap screw 11, having a conical head 12, corresponding with the similarly shaped head 6, of the bolt, shown in Figs. 2 and 3, and acting to hold the balls in their races.

In the construction illustrated in Figs. 6 to 8 inclusive, the dome 12ª is cast or otherwise constructed of relatively large size, but slight height or thickness, and is provided at its periphery with a downwardly and outwardly opening ball race in which are secured many balls 13, any desired number thereof being used, as required. Rigidly secured by means of screws or otherwise on the under side of the dome to project into the race, is a disk 14, which forms part of one side of the race and acts to confine the balls in place at all times. An upwardly extending boss 15, is provided at the center of the dome, as shown in Figs. 7 and 8, and provided with a cylindric aperture opening thereinto, having a cup shaped or concave bottom, adapted to receive a pin 16, having a slotted aperture therethrough to receive a counter pin 17, extending through the side of the boss and through said pin and integrally connected with the pin at its upper end is a supporting plate or table 18, adapted to support the article to be moved thereon.

The operation is as follows: The construction lends itself readily to a large range of uses, and is admirably adapted to carry any required load. The utmost freedom of movement of the caster is possible with slight exertion, owing to the balls readily disposing themselves in the line of least resistance when pressure is brought to bear to move the article supported on the caster in any direction. The curvature of the ball race transversely being much greater than the curvature of the individual balls, affords small contact for said balls in said race, and in consequence the friction is but slight, permitting the balls to readily turn.

Numerous details of construction, of course, may obviously be varied without departing from the principles of this invention.

I claim as my invention:

1. A ball caster, embracing an inverted cup member, an integral downwardly directed member extending coaxially within and curved coincident with said cup, balls adapted to fit in said cup, and retaining means curved coincidently with said cup and axial member and secured to the latter to retain the balls in said cup.

2. A ball caster, embracing an inverted cup member having an annular ball race near the periphery thereof, balls in said race, and removable means secured to one side of said race and curved coincidently therewith and forming an unbroken continuation of said race and adapted to retain the balls therein.

In testimony whereof I have hereunto subscribed my name in the presence of two subscribing witnesses.

JOHN B. GLOWACKI.

Witnesses:
CHARLES W. HILLS, Jr.,
GEORGE R. MOORE.